(12) United States Patent
Aravala et al.

(10) Patent No.: US 10,963,799 B1
(45) Date of Patent: Mar. 30, 2021

(54) PREDICTIVE DATA ANALYSIS OF STOCKS

(71) Applicant: Wells Fargo Bank, N.A., San Francisco, CA (US)

(72) Inventors: Srinivasa Rao Aravala, Visakhapatnam (IN); Rajgopal D. Tirumalai, Hyderabad (IN)

(73) Assignee: WELLS FARGO BANK, N.A., San Francisco, CA (US)

( * ) Notice: Subject to any disclaimer, the term of this patent is extended or adjusted under 35 U.S.C. 154(b) by 965 days.

(21) Appl. No.: 15/588,106

(22) Filed: May 5, 2017

Related U.S. Application Data

(60) Provisional application No. 62/332,182, filed on May 5, 2016.

(51) Int. Cl.
| | |
|---|---|
| *G06N 5/04* | (2006.01) |
| *G06Q 40/04* | (2012.01) |
| *G06N 20/00* | (2019.01) |
| *G06F 16/245* | (2019.01) |

(52) U.S. Cl.
CPC .............. *G06N 5/04* (2013.01); *G06F 16/245* (2019.01); *G06N 20/00* (2019.01); *G06Q 40/04* (2013.01)

(58) Field of Classification Search
None
See application file for complete search history.

(56) References Cited

PUBLICATIONS

A. Nikfarjam, E. Emadzadeh and S. Muthaiyah, "Text mining approaches for stock market prediction," 2010 The 2nd International Conference on Computer and Automation Engineering (ICCAE), pp. 256-260. (Year: 2010).*
Nikfarjam et al, "Text mining approaches for stock market prediction", 2010 IEEE vol. 4, all pages (Year: 2010).*
Wuthrich et al., "Daily Stock Market Forecast from Textual Web Data", 1998, IEEE, all pages (Year: 1998).*

\* cited by examiner

*Primary Examiner* — Daniel C Puentes
(74) *Attorney, Agent, or Firm* — Walter Haverfield LLP; James J. Pingor

(57) ABSTRACT

Provided is a self-correcting stock price movement predictor built with Artificial Intelligence (AI) techniques that are for empirical data and represent trends on a particular day for an identified stock. Robots, Internet bots, and so forth, are used to source events in real time in the World Wide Web and which may have a potential impact on the movement of the stock. When the web is spidered (or browsed), a device is able to capture the data, which might have an impact on the stock. The data may be structured and ranked using various techniques, including AI techniques. These techniques are applied in order to predict the stock behavior and the movement of that particular stock. An output of the tool is provided to automatically determine an action to take relative to an identified stock.

18 Claims, 12 Drawing Sheets

PREDICTIVE DATA ANALYSIS OF STOCKS

CROSS-REFERENCE TO RELATED APPLICATIONS

This application claims the benefit of U.S. Provisional Application Ser. No. 62/332,182, filed May 5, 2016, and entitled "PREDICTIVE DATA ANALYSIS OF STOCKS," the entirety of which is expressly incorporated herein by reference.

BACKGROUND

Investment in stocks is performed by individuals and some companies in an attempt to increase revenue. Predicting whether the value of a stock will increase or decrease may yield profit to the individual or the company. There are three broad (overlapping) categories of prediction, namely, fundamental analysis, technical analysis (charting), and technological methods. Fundamental analysis relates to evaluating the company that underlies the stock. Technical analysis seeks to determine a future price of a stock based on trends of the past price of the stock. Technological methods attempt to mimic human thinking. However, all of these prediction techniques fail to adequately address dynamic changes based on social and other influential factors.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The various aspects provided herein are related to predictive data analysis of stocks. An aspect relates to a system that includes a processor and a memory that stores executable instructions that, when executed by the processor, facilitate performance of operations. The operations may include gathering events at substantially the same time as events are available over an Internet connection and extracting a set of data determined to be relevant for an identified stock from the gathered events. The operations may also include mining historical data and respective outcomes for other data that is similar to the set of data. Further, the operations may include determining a price movement of the identified stock based on the other data and the respective outcomes and determining a confidence level associated with the price movement. The operations may also include outputting the price movement and the confidence level in a perceivable format. According to some implementations, the operations may include storing the extracted data in a data store, the extracted data is retained as historical data.

Another aspect relates to a method that may include obtaining, by a system comprising a processor, events at substantially the same time as the events are available over an Internet connection. The method may also include identifying, by the system, data determined to be relevant for an identified stock from the gathered events. Further, the method may include determining, by the system, a price movement of the identified stock based on historical data and an associated historical outcome. Also, the method may include determining, by the system, a confidence level associated with the price movement. The method may also include communicating, by the system, the price movement and the confidence level to a device at substantially the same time as the events are available over the Internet connection. According to some implementations, determining the price movement and the determining the confidence level may include using artificial intelligence techniques to perform predictive analysis.

Another aspect relates to a computer-readable storage device that stores executable instructions that, in response to execution, cause a system comprising a processor to perform operations. The operations may include obtaining events at substantially the same time as the events are available over an Internet connection and identifying data determined to be relevant for an identified stock from the gathered events. The operations may also include determining a price movement of the identified stock based on historical data and an associated historical outcome. Further, the operations may include determining a confidence level associated with the price movement. The operations may also include communicating the price movement and the confidence level to a device at substantially the same time as the events are available over the Internet connection. Further, the operations may include storing the obtained events as historical data.

To the accomplishment of the foregoing and related ends, certain illustrative aspects of the innovation are described herein in connection with the following description and the annexed drawings. These aspects are indicative, however, of but a few of the various ways in which the principles of the innovation may be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Various non-limiting embodiments are further described with reference to the accompanying drawings in which.

DETAILED DESCRIPTION

The innovation is now described with reference to the drawings. In the following description, for purposes of explanation, numerous specific details are set forth in order to provide a thorough understanding of the subject innovation. It may be evident, however, that the innovation may be practiced without these specific details. In other instances, well-known structures and devices are shown in block diagram form in order to facilitate describing the innovation.

Various aspects described herein relate to a self-correcting stock price movement predictor. The predictor may be based on empirical data. Additionally or alternatively, the predictor may utilize artificial intelligence techniques based on the empirical data to predict the movement. Further, information may be provided in any perceivable format that facilitates a prediction for a particular stock and a confidence level associated with that prediction.

Disclosed herein is a self-correcting stock price movement predictor that may have built in Artificial Intelligence (AI) techniques that are for empirical data and represent trends on a particular day, for example. Various aspects may be configured to spider the web (e.g., crawl the Internet, systematically browse the World Wide Web, and so on) using techniques applicable in the technology. Such technique may include robots, Internet bots, and so forth. The various aspects source events in real time in the World Wide Web and for those events that may have a potential impact on the movement of the stock. When the web is spidered (or browsed), a device is able to capture the data, which might have an impact on the stock.

The data may be structured and ranked using various techniques, including Artificial Intelligence techniques. These techniques are applied in order to predict the stock behavior and the movement of that particular stock. A goal is to give the tool to an analyst that may be able to obtain some idea or some benefits on how the stock is doing on a current day on any particular exchange (e.g., U.S. exchange, London exchange, Indian exchange, or any other exchanges). According to some implementations, the predictions may be utilized to automatically implement an event related to a stock.

Figure 1:
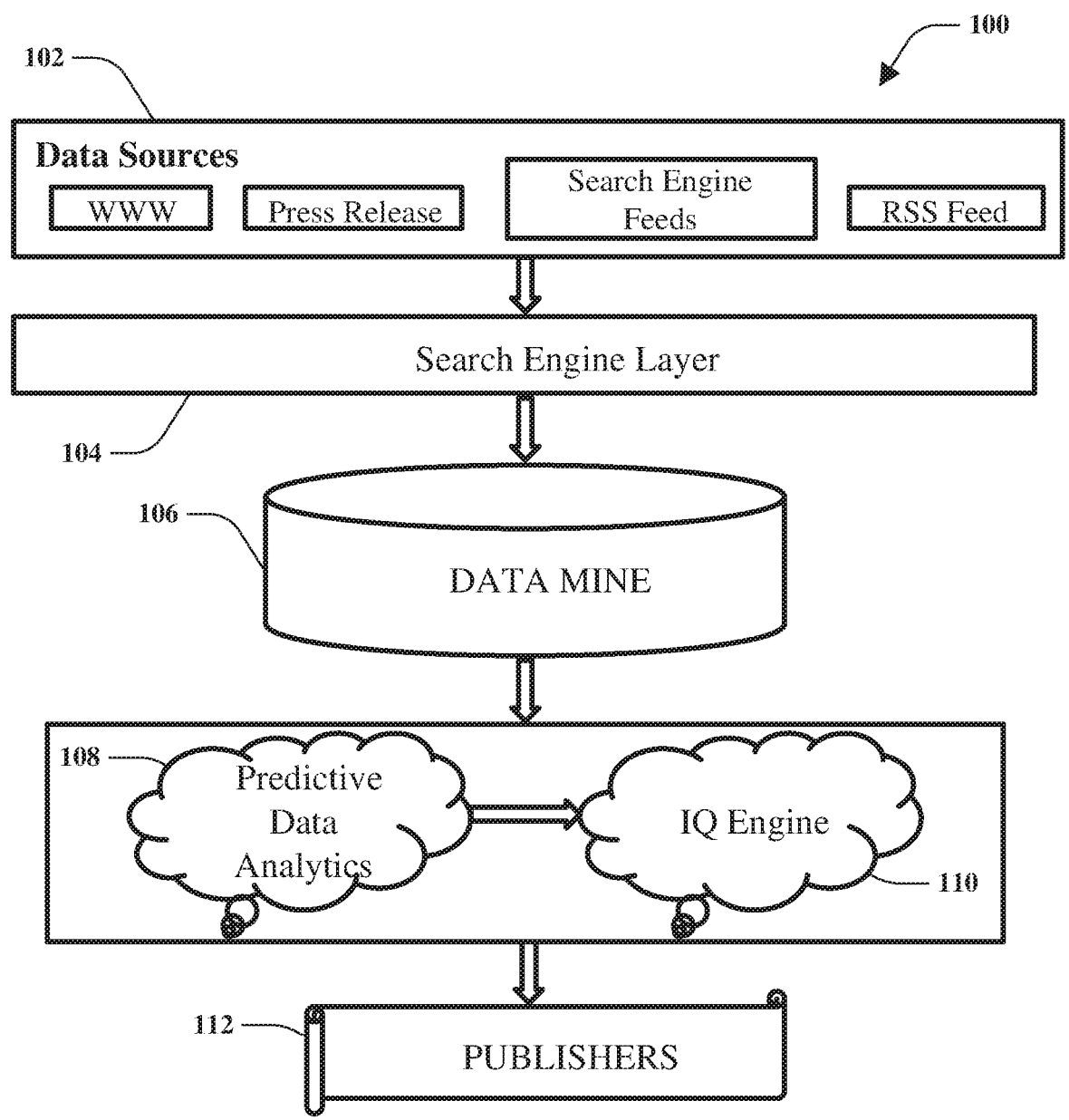
FIG. 1 illustrates an example, non-limiting high-level architecture of a system configured to perform predictive data analysis of stocks, according to an aspect.

FIG. 1 illustrates an example, non-limiting high-level architecture of a system 100 configured to perform predictive data analysis of stocks, according to the various embodiments. The various aspects discussed herein may be configured to evaluate (e.g., "spider" or browse) the web (e.g., the World Wide Web) for events that may potentially affect the stock price of a company. The evaluation may be performed using web bots, for example. The events may be stored in a database and/or in maps. Maps are in memory data base programming language specific for faster processing of events, later the events and/or calculated scores may be saved into a permanent database. Rankings may be applied that are utilized to predict the stock behavior in the market. For example, one or more artificial intelligence techniques may be applied for the ranking and its possible effects on the stock, which may be utilized to predict the stock's behavior in the market. This information may be shared with research analysts/traders for the observations regarding the stocks in the market and/or may be automatically applied based on various rules and/or policies.

Stock market trends may change based on various factors. For example, the Federal Reserve may make an announcement and, based on this announcement, there may be a change in the price of one or more stocks (e.g., an upward movement or a downward movement). In another example, there may be a change in corporate action that causes a movement to the price of stock for that company. Thus, various events that occur in the global market may cause a stock's value to change.

The system 100 operates by categorizing predefined events known as classes that may have an impact on the stock's price movement. The classes identify the categories that will be bucketed into the events. Whenever these events are sourced from the spider (e.g., when it goes through the web and extracts information), those events are bucketed into the subsequent categories of classes and each category of classes have a particular weightage and a ranking.

The system 100 (e.g., the spider tool) is also a self-correcting IQ (Intelligence Quota) engine. Thus, once a ranking is applied and a certain percentage based on the predictions is applied, this tool also has an IQ where it may analyze how it has performed in the past based on events on a previous date (e.g., through a feedback loop). If the system 100 predicted a stock change of 2% upwards and a certain weight, for example 70% favorable conditions, the system 100 will apply those previous predictions to give the accuracy for a next (e.g., future) prediction. The classes will be computed, the average is maintained, and the percentage responding to the score is given to indicate the movement (e.g., upward, downward), at which percentage, and at what confidence level the stock movement will be moving up or down.

With continuing reference to FIG. 1, a data sources layer 102 may include the sources of input to the system 100 (or tool). Thus, the system 100 (e.g., an analyzer) may be configured to review various locations for any events related to stock, index, and/or sector. Such locations include, but are not limited to, the World Wide Web, Press Releases, Search Engine Feeds, RSS Feeds, instructions, and so on. Additionally or alternatively, the data sources layer 102 may be emails, email replies, social media feeds, social media updates, and other inputs that may be a potential data source.

A search engine layer 104 or search engine component may be a filter component that searches from the data sources layer 102 and extracts the necessary information. For example, the necessary information may be any information that may have an influence on a price of a stock or other security being analyzed. The search engine layer 104 may be configured to receive the input from the data source(s) and responses (which may be in different formats) and validate the inputs. The inputs may also be constructed (or reconstructed) in a readable format.

The information extracted from the search engine layer 104 (e.g., the filter component) may be stored in a data mine layer 106 or another storage media. The information may be stored at substantially the same time as the information is received or at different intervals. For example, the information stored in the data mine layer 106 may be updated daily.

The next layer includes predictive data analytics 108 and an IQ engine 110. The predictive data analytics 108 is responsible for extracting, ranking, and sourcing, the data events from the data mine layer 106. The predictive data analytics 108 is also responsible for preparing a report of events and assigning the events to a class/category structure. Thus, the predictive data analytics 108 may be configured to assign the proper scoring techniques and applying those scoring techniques from the events extracted from the message and send the extracted events to an appropriate class of category structure.

An industry sector may be one of the classes identified. For example, if the system 100 is making a prediction on a Microsoft stock and Oracle (or another technical company) takes a big order, that big order is taken into consideration for a sector based movement prediction. Further, the various aspects discussed herein may be extended to incorporate a prediction of a particular sector, rather than individual stocks.

The IQ engine 110 is a calculation and statistics engine that receives the input from predictive data analytics 108 and prepares stock market prediction data. The IQ engine 110 applies all the calculations, which are built into the IQ engine 110. Further, the IQ engine 110 applies the data created by analytics to created and/or predict certain metrics. The IQ engine 110 applies these statistical formulas to create a score that predicts the stock market movement.

A publishing layer 112 may include a publisher where the report prepared by the IQ engine 110 is published to various downstream systems. Examples of such systems include emails, short message service (SMS), reporting, and so on. The published information may include an amount of movement predicted for the stock price. Additionally, the information may include a confidence level associated with the predicted amount of movement. In an example, the published information may indicate that xyz stock is expected to increase from $20.13 per share to $33.67 per share with a confidence level of 7%. In another example, the published information may indicate that yza stock is expected to have a price decrease of 3% with a confidence level of 15%. In another example, the published information may indicate that xyz stock is expected to increase from $20.13 to 21.13 per share with a confidence of 60%, xyz stock is expected to increase from $20.13 to 22.13 per share with a confidence of 50%, xyz stock is expected to increase from $20.13 to 23.13 per share with a confidence of 40%, xyz stock is expected to increase from $20.13 to 24.13 per share with a confidence of 30%, and so on. Accordingly, in some embodiments, the confidence level may change responsive to the percentage of change in the stock's price. In other embodiments, the confidence level may be directly proportional to the change in the stock's price or the confidence level may be inversely proportional to the change in the stock's price.

In accordance with some implementations, the published information may include an expected time range for the change in price or movement. In the first example above, the published information by indicate that xyz stock is expected to increase from $20.13 per share to $33.67 per share over the next 4 days with a confidence level of 7%. In another example, the published information may indicate that yza stock is expected to have a price decrease of 3% over the next 24 hours with a confidence level of 15%.

Thus, the search engine layer 104 receives data from the data sources layer 102 and sends the data into the data mine layer 106. The data mine layer 106 applies techniques to prepare the data so that the IQ engine 110 may calculate a final score that is published to various downstream systems by the publishing layer 112.

It is noted that various industries have events that matter more to that industry than to other, affiliated industries. Further, an event may affect one company within a particular industry more than for another company within that industry. For example, for a pharmaceutical company or a biomedical device company, analysis by the U.S. Food and Drug Administration may have a large effect on the affected company. Thus, a different weighting may be applied based on the estimated impact an event will cause to the price of a stock.

In an interest rate movement example, in a lower interest rate environment, companies want to borrow more because money is cheaper than in a higher interest rate environment. In this situation, a weight may be applied with a higher rating because the source becomes cheaper. Further details related to how the weightage for events are assigned will be provided below.

Figure 2:
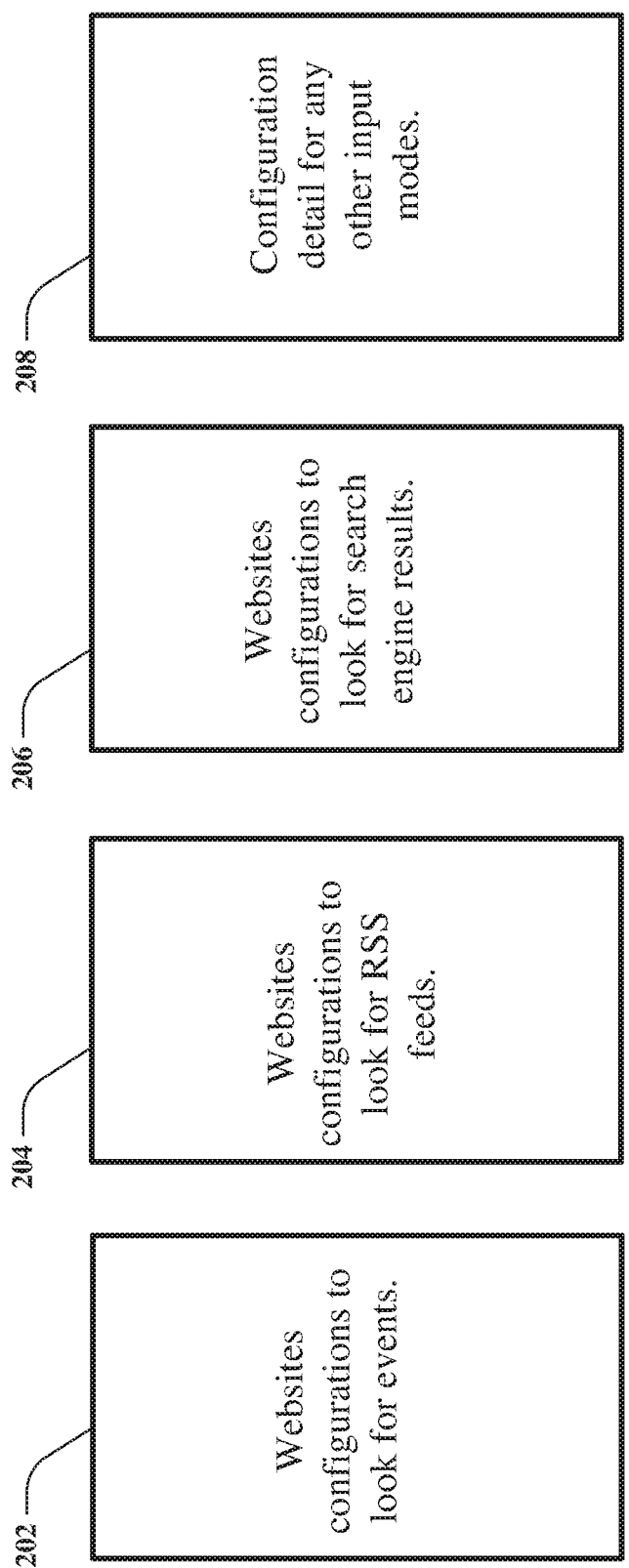
FIG. 2 illustrates example non-limiting data sources for low level analysis, according to an aspect.

FIG. 2 illustrates example non-limiting data sources for low level analysis, according to an aspect. The data sources may include, but are not limited to websites configuration to look for events 202 (e.g., www.xyz.com, www.events.com and so on). Another data source may include websites configurations to look for RSS feeds 204 (e.g., www.xyz.com, www.events.com and so on). A further data source may include website configurations to look for search engine results 206 (e.g., www.google.com, www.bing.com and so on). Yet another data source may include configuration detail for other input modes 208 (e.g., database connections, internal events, and so forth).

The content of the data sources may be dynamic xml files (atomic) that contain the configurations. The content may also be from RSS feeds, search engine results, or other events. According to some implementations, stock or financial analysists may also publish these reports (public information) and the system may be configured to access those requests.

Figure 3:
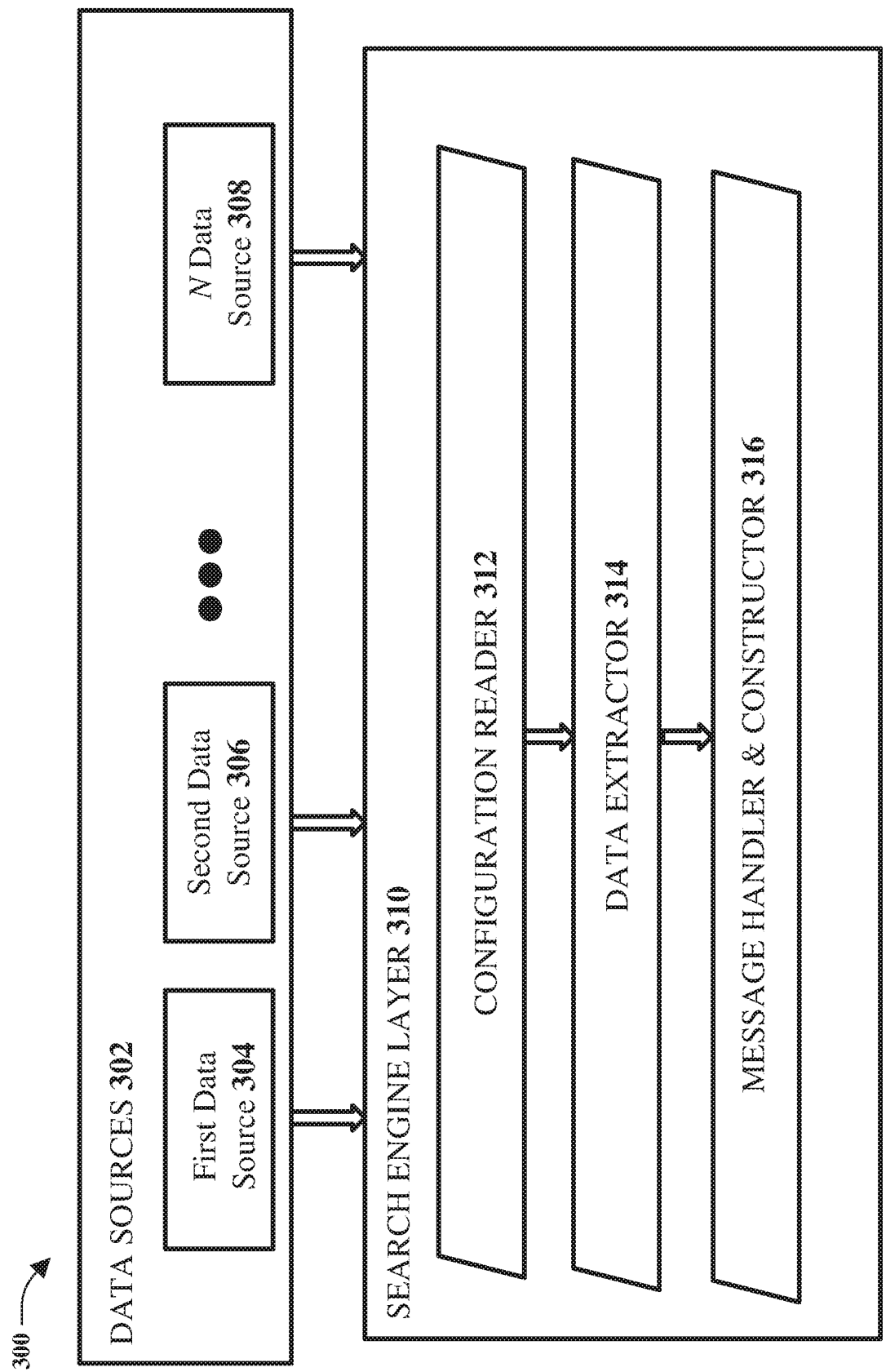
FIG. 3 illustrates an example non-limiting search engine layer for low level analysis, according to an aspect.

FIG. 3 illustrates an example non-limiting search engine layer 300 for low level analysis, according to an aspect. Data sources 302 (e.g., the data sources layer 102 of FIG. 1), may include a first data source 304, a second data source 306, through an N data source 308, where N is an integer.

The information from the data sources is provided to a search engine layer 310 (e.g., the search engine layer 104 of FIG. 1). The search engine layer 310 may include various processes or layers that may read multiple configurations in multiple data sources. Once the data source input reads the data (e.g., by a configuration reader layer 312), a data extractor layer 314 may be configured to extract the data using bot techniques, for example. The data extractor layer 314 may start to download all of the data available through the web (raw data). Then a message handler and constructor layer 316 constructs the messages in a readable format that the tool may understand.

Figure 4:
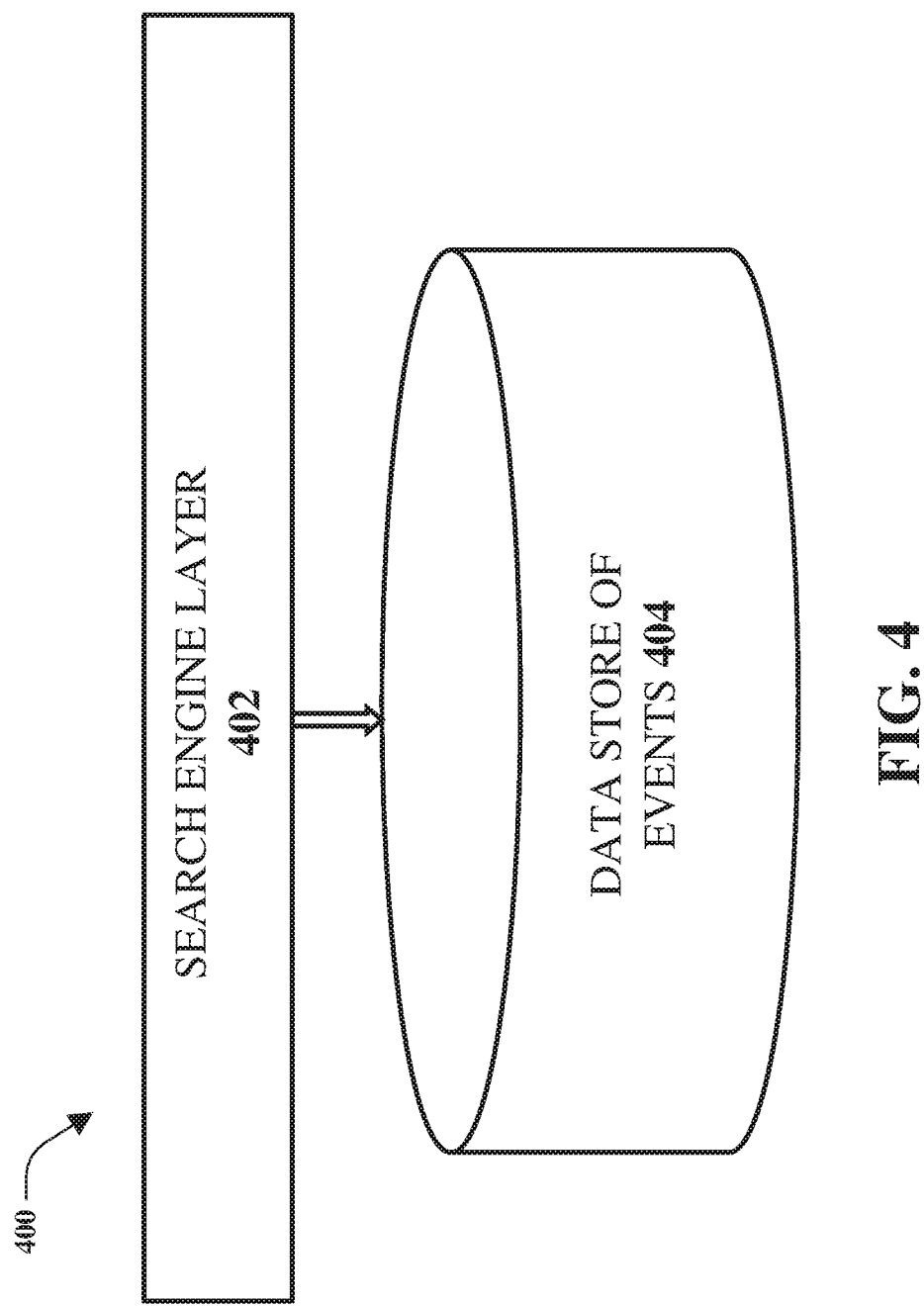
FIG. 4 illustrates an example non-limiting low level architecture for a data mine layer, according to an aspect.

FIG. 4 illustrates an example non-limiting low level architecture for a data mine layer 400, according to an aspect. The data mine layer 400 is similar to the data mine layer 106 of FIG. 1. The data mine layer 400 is a storage node for the entire tool. The data mine layer 400 may include a search engine layer 402 (e.g., the search engine layer 310 of FIG. 3) and a data store of events 404. The following are examples of a few main Class/Categories or Event Master where all the events may be sub-classed: Corporate Actions, GeoPolitical, Sector Based Events, Climate, Macro Economic Outlook, Local Markets Performance, Global Markets Performance, Historical Trends, Self Correction Stick, and so on. It is noted that fewer or more Class/Categories may be utilized and the disclosed aspects are not limited to these example Class/Categories.

Figure 5:
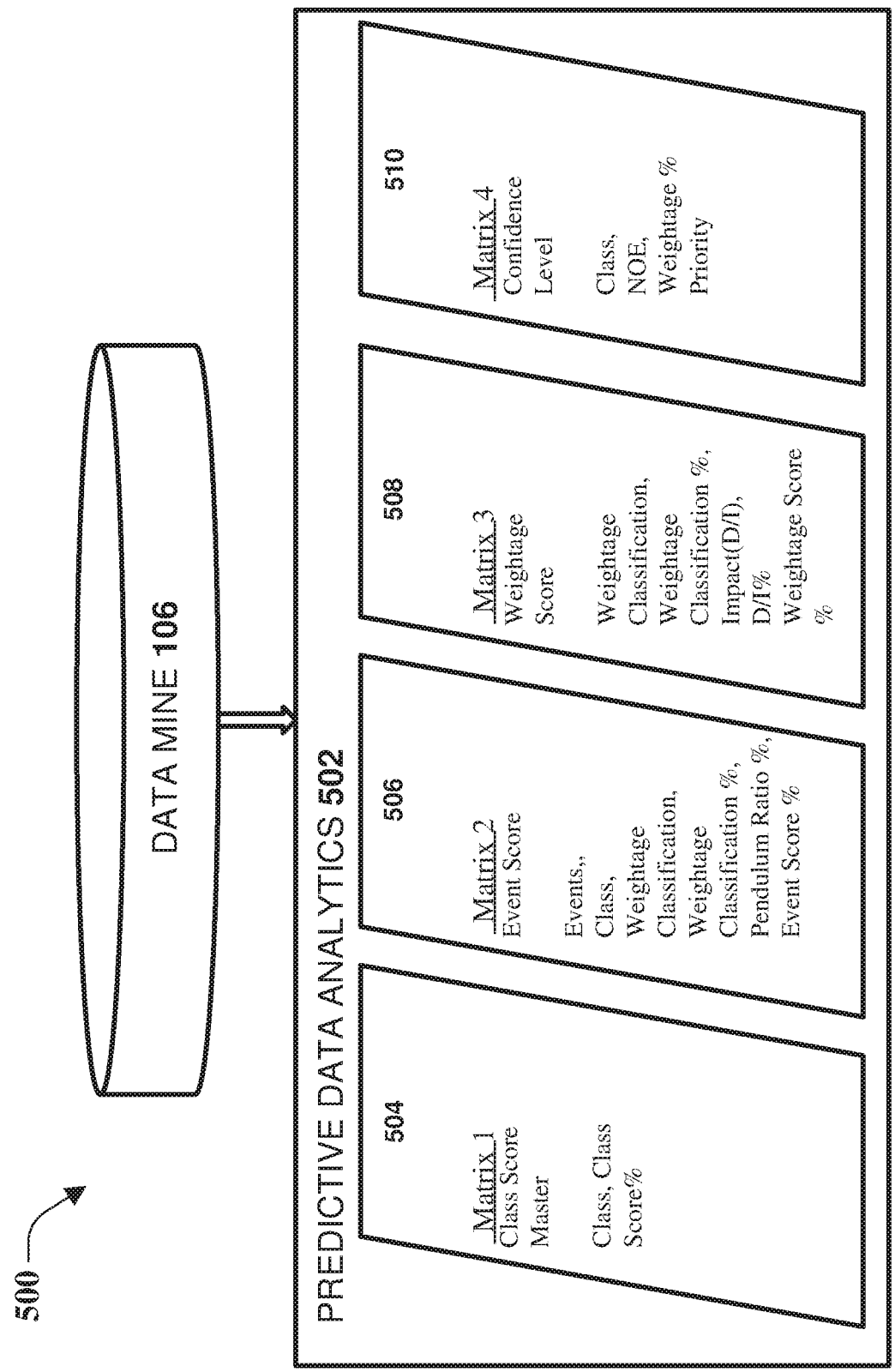
FIG. 5 illustrates an example non-limiting representation of low level analysis by predictive data analytics, according to an aspect.

FIG. 5 illustrates an example non-limiting representation 500 of low level analysis by predictive data analytics, according to an aspect. A predictive data analytics 502 receives information from the data mine layer 106 and may prepare data for a set of matrixes, illustrated as a first matrix 504, a second matrix 506, a third matrix 508, and a fourth matrix 510. It is noted that these matrixes are examples and fewer or additional matrixes may be included in the predictive data analytics 502. Thus, the predictive data analytics 502 computes and calculates and extracts the information and assigns the data into the corresponding matrix.

The first matrix 504 may include a class score master, which may include the class and the class score, represented as a percentage. The class includes the categories, which are events such as geo-political events, climate events, macro events, geographical events, sector based events, and so on. In an example, the stock may be a technology stock or a pharmaceutical stock and, for the climate conditions, a corporate action may be a class. Other examples include global market indexes, historical trends, and searches (e.g., user entered searches), and so on.

The class score percentage may include a class pool that indicates how many events are contributing to the climate and how many are contributing to corporate action, global markets, and how the markets are performing based on historical trends. In an example, the historical trends may analyze how the stock has performed in the last few months, years, and so on, as it relates to the same data, or similar data. This also predicts the tool's correction mechanism, which may correct itself based on its previous predictions to have accurate future predictions. This may be implemented through a feedback loop, for example.

The second matrix 506 may include one or more event scores. The event scores may include events, class, weightage, classification, weightage, classification percentage, pendulum ratio percentage, event score percentage, and so on. The events matrix includes what events are happening on the web and which events belong to a class or category. This determines the weight for the events. Examples of weights may include a positive event or a negative event. Further, the positive events and/or negative events may be classified in subcategories, such as a high positive event, a medium positive event, a low positive event, a low negative event, a medium negative event, a high negative event, and so on. Although discussed with respect to three categories for positive events and three categories for negative events, fewer or more than three categories may be applied to the types of events. Further, there is a classification and pendulum ratio which indicates whether the swing will be upward movement or downward movement. In addition, there is an events score for a particular event.

The third matrix 508 may include a weightage score. Included in the weightage score may be weightage classification, weightage classification percentage, impact (D/I), D/I percentage, weightage score percentage, and so on. The weighted score for the classification may indicate if the event has a positive trend or negative trend. Also the impact on the event and/or whether it is an indirect atomic event or a direct atomic event. For example, if the event has an impact of fifty percent (50%), an indirect impact maybe one hundred and fifty percent (150%) of a current impact.

The following is an example, non-limiting Matrix 3 that will be used for illustration purposes.

Matrix 3

| Weightage Classification | Weightage Classification % (D/I) | Impact (D/I) | D/I % | Weightage Score % |
|---|---|---|---|---|
| Positive High (PH) | 5 | Direct | 105 | (5 * 105/100) |
| Positive Medium (PM) | 3 | Indirect | 102 | (3 * 102/100) |
| Positive Low (PL) | 1 | Direct | 100 | |

Matrix 3-continued

| Weightage Classification | Weightage Classification % (D/I) | Impact (D/I) | D/I % | Weightage Score % |
|---|---|---|---|---|
| Negative High (NH) | −5 | Direct | 110 | |
| Negative Medium (NM) | −3 | Indirect | 105 | −(3 * 105/100) |
| Negative Low (NL) | −1 | Indirect | 100 | −(1 * 100/100) |

The event score percentage may be calculated by multiplying the weightage score and the pendulum ratio/swing ratio. This is represented by the following equation:

(WeightageScore*Pendulum Ratio/Swing Ratio)
=Event Score %

In an example, assume a stock split has occurred in a company called ABC. Assume a pendulum ratio or swing ratio is 0.5% (positive and negative swing ratio). Using the above equation and Matrix 3, the following event score percentages may be calculated.

Positive High (5*105/100)*Pendulum Ratio % or PR
%=(5.25*0.5%)=2.625% event score Positive Medium (3*102/100)*PR %=(3.06*0.5%)=1.53% event score Negative Medium −(3*105/100)*PR %=−(3.15%*0.5%)=−1.575% event score Negative Low −(1*100/100)*PR %=−(1*0.5)=−0.5% event score According to the above illustration, a positive event with high impact and direct impact, results in a swing of 2.625%. A positive event with medium impact and direct impact, results in a swing of 1.53%. A negative event with medium impact and indirect impact, results in a swing of −1.575%. Further, a negative event with low impact and indirect impact, results in a swing of −0.5%

Thus, if the stock for ABC company from the above example is to be placed under Positive High, Direct Impact, under Corporate Actions class category, then it will take a company stock swing of +2.625%.

The fourth matrix 510 may include a confidence level, which represents the prediction confidence. The confidence level may be associated with a class, NOE, weightage percentage, priority of events, and so on. In an example, the confidence level may be that there is a 70% confidence that the price will move 5% in an upward direction. In another example, the confidence level may be that there is a 35% confidence that the price will move 10% in a downward direction.

Figure 6:
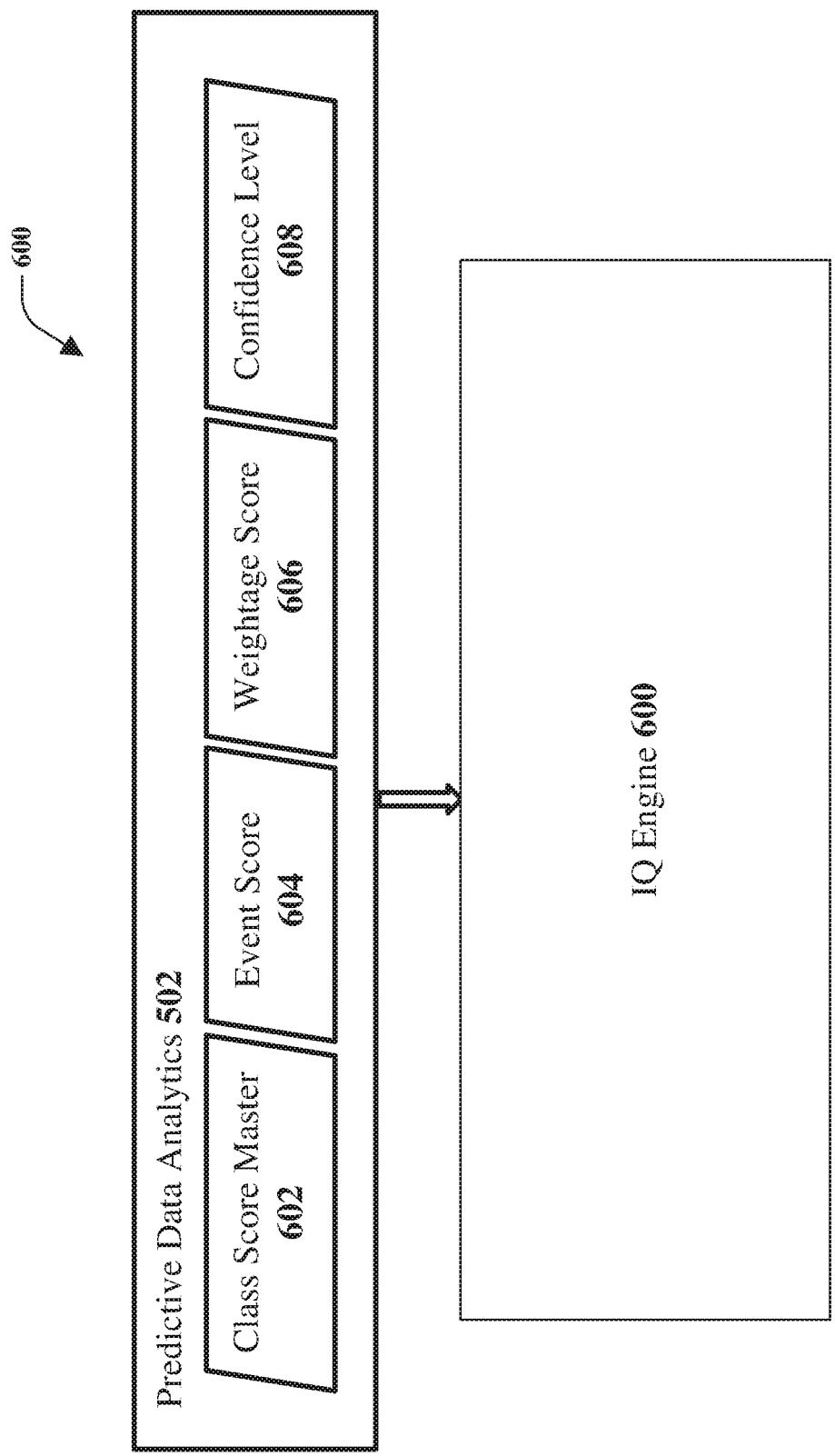
FIG. 6 illustrates an example non-limiting IQ engine utilized for low level analysis, according to an aspect.

FIG. 6 illustrates an example non-limiting IQ engine 600 utilized for low level analysis, according to an aspect. As illustrated the predictive data analytics 502 may include various matrices, illustrated as a class score master 602, an event score 604, a weightage score 606, and a confidence level 608.

The information from the predictive data analytics 502 is provided to the IQ engine 600. The IQ engine 600 performs a calculation to determine if the score of the movement is higher or lower and the corresponding confidence level. The pendulum ratio is a swing or movement. The equation used by the IQ engine 600 uses a percentage of the event represented as a number of lesser events and a number of higher events.

The class score percentage may be the number of events that happen in a geopolitical scenario and how many actions are raised. From these events, a class code, positive or negative, is derived. A pendulum ratio may be determined, which predicts positive events and/or negative events, compared to the trend today. Based on the pendulum ratio, other predictions are made, such as what is the negative percentage and the positive percentage.

In an example, the confidence level may be based on priorities of the top five (or other number) events, either positive or negative. The middle of the priority of the top 5% amount to 70%, thus, there is a confidence of 70%.

Figure 7:
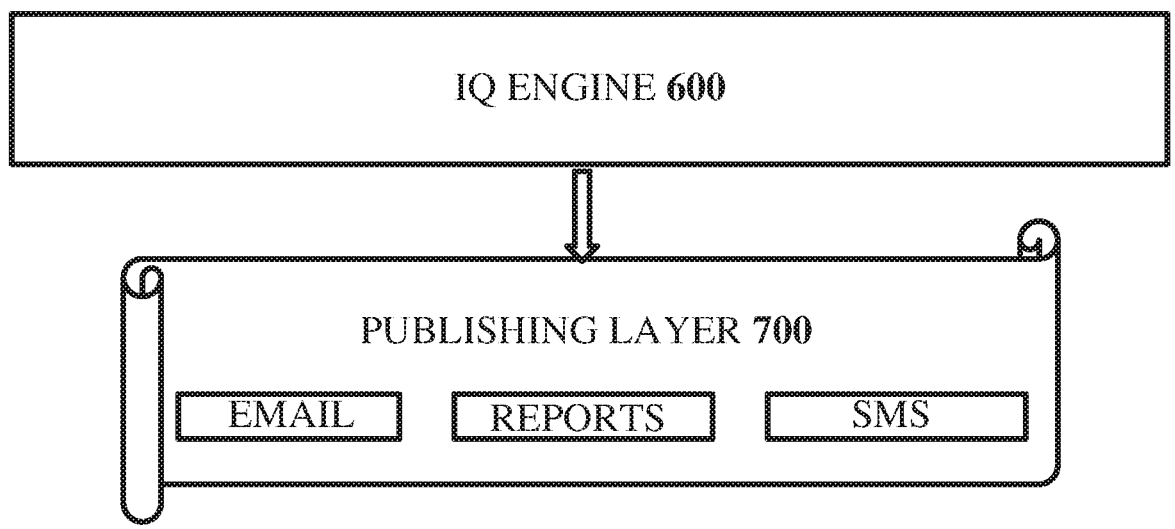
FIG. 7 illustrates an example non-limiting representation of a publishing layer, according to an aspect.

FIG. 7 illustrates an example non-limiting representation of a publishing layer 700, according to an aspect. The publishing layer 700 receives data from the IQ engine 600. The publishing layer 700 may output the data in various perceivable formats including, but not limited to email, reports, and text messages (e.g., sms). The output may include both the price movement and the confidence level. The price movement may be expressed as a percentage, as a dollar amount, or in other terms that are understandable to those that perceive the output. The publishing layer 700 outputs the data to downstream systems for use to determine an action to be taken on a particular stock.

Figure 8:
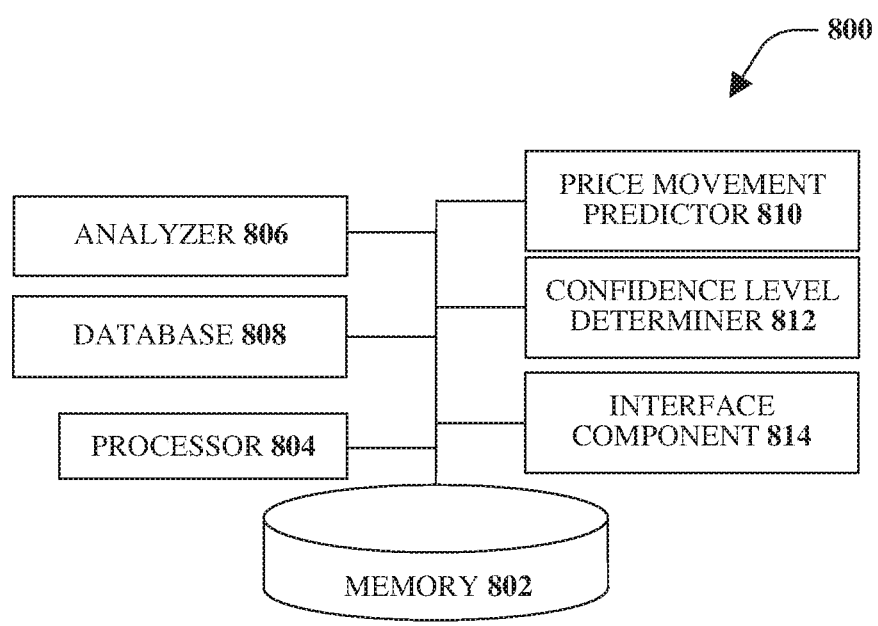
FIG. 8 illustrates an example non-limiting system for data analytics, according to an aspect.

FIG. 8 illustrates an example non-limiting system 800 for data analytics, according to an aspect. The various aspects discussed herein relate to empirical analysis based on the trends in the market. The empirical analysis is also based on the categories that will impact the market and also the formulas derived in one of the models. The output not only predicts the percentage the stock will move upward (or downward), but also provides the confidence level associated with that prediction. Thus, if it is determined that the stock will definitely be going up by 5% based on the analysis, the confidence level is high. Thus, multiple different forms of information (e.g., % movement, % confidence, time frames) is provided in order to make an informed decision.

The system 800 may include at least one memory 802 that may store computer executable components and/or computer executable instructions. The system 800 may also include at least one processor 804, communicatively coupled to the at least one memory 802. The at least one processor 804 may facilitate execution of the computer executable components and/or the computer executable instructions stored in the at least one memory 802. The term "coupled" or variants thereof may include various communications including, but not limited to, direct communications, indirect communications, wired communications, and/or wireless communications.

It is noted that although the one or more computer executable components and/or computer executable instructions may be illustrated and described herein as components and/or instructions separate from the at least one memory 802 (e.g., operatively connected to the at least one memory 802), the various aspects are not limited to this implementation. Instead, in accordance with various implementations, the one or more computer executable components and/or the one or more computer executable instructions may be stored in (or integrated within) the at least one memory 802. Further, while various components and/or instructions have been illustrated as separate components and/or as separate instructions, in some implementations, multiple components and/or multiple instructions may be implemented as a single component or as a single instruction. Further, a single component and/or a single instruction may be implemented as multiple components and/or as multiple instructions without departing from the example embodiments.

Also included in the system 800 may be an analyzer 806 that may be configured to search the web for any information that is available across the World Wide Web that may affect the stock price of a company. The information may be from a multitude of sources including, but not limited to, a news source, company webpages, social media sites, blogs, forums, and so on. The analyzer 806 may obtain the information by using web bots (e.g., an Internet bot computer program), for example, that operates by tracking keywords. The analyzer 806 may be included in the search engine layer 104 of FIG. 1

The information obtained by the analyzer 806 may be retained in a database 808 associated with the data mine layer 106 of FIG. 1, in the at least one memory 802, or in another system 800 component. According to some implementations, the information obtained by the analyzer 806 may be retained external to the system 800, wherein the system 800 accesses the external source as needed.

Also included in the system 800 may be a price movement predictor component 810 that may be configured to determine whether a stock price will stay the same, increase, or decrease. Further, the price movement predictor 810 may be configured to determine an amount of the movement. For example, the price movement predictor 810 may indicate the price will increase by 7%. In another example, the price movement predictor 810 may indicate the price will decrease by 3%.

In accordance with some implementations, the price movement predictor 810 may be configured to indicate a time range associated with the price movement. For example, the price movement predictor 810 may indicate the price will increase by 22% over the next four days. In another example, the price movement predictor 810 may indicate the price will decrease by 14% within the next week.

A confidence level determiner 812 may be configured to provide a confidence level associated with the stock movement prediction. The confidence level may be utilized, in conjunction with the price movement prediction to automatically implement one or more actions. For example, if the confidence level is high (e.g., over 90%) and the price movement is a downward trend, a particular stock may be sold immediately.

Also included in the system may be an interface component 814. The interface component 814 may be configured to receive input and also to output results of the prediction (e.g., confidence level, amount of price movement, and so on).

According to some implementations, the interface component 814 (as well as other interface components discussed herein) may provide a graphical user interface (GUI), a command line interface, a speech interface, Natural Language text interface, and the like. For example, a Graphical User Interface (GUI) may be rendered that provides a user with a region or means to load, import, select, read, and so forth, various requests and may include a region to present the results of the various requests. These regions may include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the information conveyance, such as vertical and/or horizontal scroll bars for navigation and toolbar buttons to determine whether a region will be viewable, may be employed. Thus, it might be inferred that the user did want the action performed.

The user may also interact with the regions to select and provide information through various devices such as a mouse, a roller ball, a keypad, a keyboard, a pen, gestures captured with a camera, a touch screen, and/or voice activation, for example. According to an aspect, a mechanism, such as a push button or the enter key on the keyboard, may be employed subsequent to entering the information in order to initiate information conveyance. However, it is to be appreciated that the disclosed aspects are not so limited. For example, merely highlighting a check box may initiate information conveyance. In another example, a command line interface may be employed. For example, the command line interface may prompt the user for information by providing a text message, producing an audio tone, or the like. The user may then provide suitable information, such as alphanumeric input corresponding to an option provided in the interface prompt or an answer to a question posed in the prompt. It is to be appreciated that the command line interface may be employed in connection with a GUI and/or Application Program Interface (API). In addition, the command line interface may be employed in connection with hardware (e.g., video cards) and/or displays (e.g., black and white, and Video Graphics Array (EGA)) with limited graphic support, and/or low bandwidth communication channels.

Figure 9:
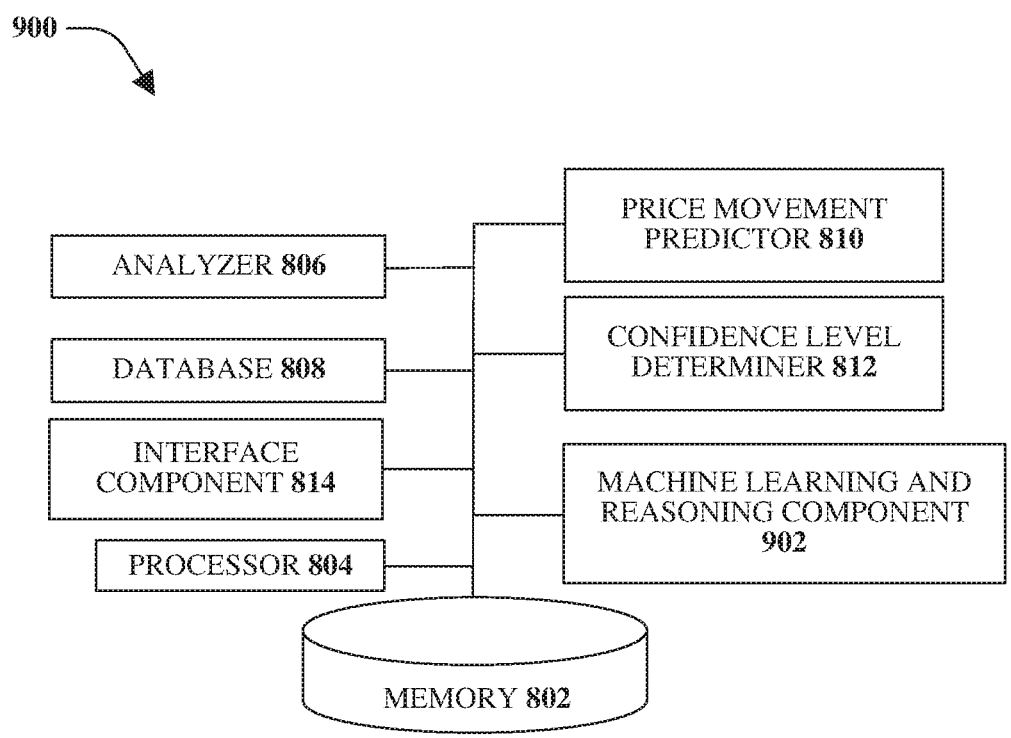
FIG. 9 illustrates an example, non-limiting system that employs automated learning to facilitate one or more of the disclosed aspects.

FIG. 9 illustrates an example, non-limiting system 900 that employs automated learning to facilitate one or more of the disclosed aspects. For example, a machine learning and reasoning component 902 may be utilized to automate one or more of the disclosed aspects. The machine learning and reasoning component 902 may employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 902 may employ principles of probabilistic and decision theoretic inference. Additionally or alternatively, the machine learning and reasoning component 902 may rely on predictive models constructed using machine learning and/or automated learning procedures. Logic-centric inference may also be employed separately or in conjunction with probabilistic methods.

The machine learning and reasoning component 902 may infer how events should be ranked in comparison to other events, which events will affect a particular stock, whether a stock will increase in price, decrease in price, or stay the same based on one or more events, and so on. Based on this knowledge, the machine learning and reasoning component 902 may make an inference based on trigger events determined based on a description of the stock, historical information associated with each stock and similar events, historical information associated with how each stock historically responded to an event, and so on.

As used herein, the term "inference" refers generally to the process of reasoning about or inferring states of the system, a component, a module, the environment, and/or customers (or devices associated with the customers) from a set of observations as captured through events, reports, data, and/or through other forms of communication. Inference may be employed to identify a specific context or action, or may generate a probability distribution over states, for example. The inference may be probabilistic. For example, computation of a probability distribution over states of interest based on a consideration of data and/or events. The inference may also refer to techniques employed for composing higher-level events from a set of events and/or data. Such inference may result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) may be employed in connection with performing automatic and/or inferred action in connection with the disclosed aspects.

The various aspects (e.g., in connection with predictive analysis of stocks) may employ various artificial intelligence-based schemes for carrying out various aspects thereof. For example, a process for determining which individual stock is (or set of stocks are) affected by an event, story, posting, news, company announcement, public perception, and so on may be enabled through an automatic classifier system and process.

A classifier is a function that maps an input attribute vector, $x=(x1, x2, x3, x4, xn)$, to a confidence that the input belongs to a class. In other words, $f(x)=confidence(class)$. Such classification may employ a probabilistic and/or statistical-based analysis (e.g., factoring into the analysis utilities and costs) to prognose or infer an action that should be employed to determine an amount of price movement one or more events are expected to cause on an identified stock, a confidence level associated with the price movement based on historical data, and so on. In the case of price fluctuations and confidence, for example, attributes may be keywords or phrases in a description of an event and the classes may be identification of an identified stock that matches a trigger event.

A support vector machine (SVM) is an example of a classifier that may be employed. The SVM operates by finding a hypersurface in the space of possible inputs, which hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein, may be inclusive of statistical regression that is utilized to develop models of priority.

One or more aspects may employ classifiers that are explicitly trained (e.g., through a generic training data) as well as classifiers that are implicitly trained (e.g., by observing user behavior, by receiving extrinsic information, and so on). For example, SVM's may be configured through a learning or training phase within a classifier constructor and feature selection module. Thus, a classifier(s) may be used to automatically learn and perform a number of functions, including but not limited to determining according to a predetermined criteria which events may cause an upward movement in a stock price, which events may cause a downward movement in a stock price, a confidence level associated with a price movement prediction, and so on, may be resolved automatically based on historical data related to the same or a similar event, the same or a similar stock in a sector, and so forth. The criteria may include, but is not limited to, similar events, historical information, current information, event attributes, and so forth.

Additionally or alternatively, an implementation scheme (e.g., a rule, a policy, and so on) may be applied to control and/or regulate which event submissions are considered to be positive with respect to the price of a stock and which are considered to be negative with respect to the price of a stock. In some implementations, based upon a predefined criterion, the rules-based implementation may automatically and/or dynamically interpret attributes associated with each event. In response thereto, the rule-based implementation may automatically interpret and carry out functions associated with the events by employing a predefined and/or programmed rule(s) based upon any desired criteria.

Methods that may be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement the disclosed methods. It is to be appreciated that the functionality associated with the blocks may be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods might alternatively be represented as a series of interrelated states or events, such as in a state diagram.

Figure 10:
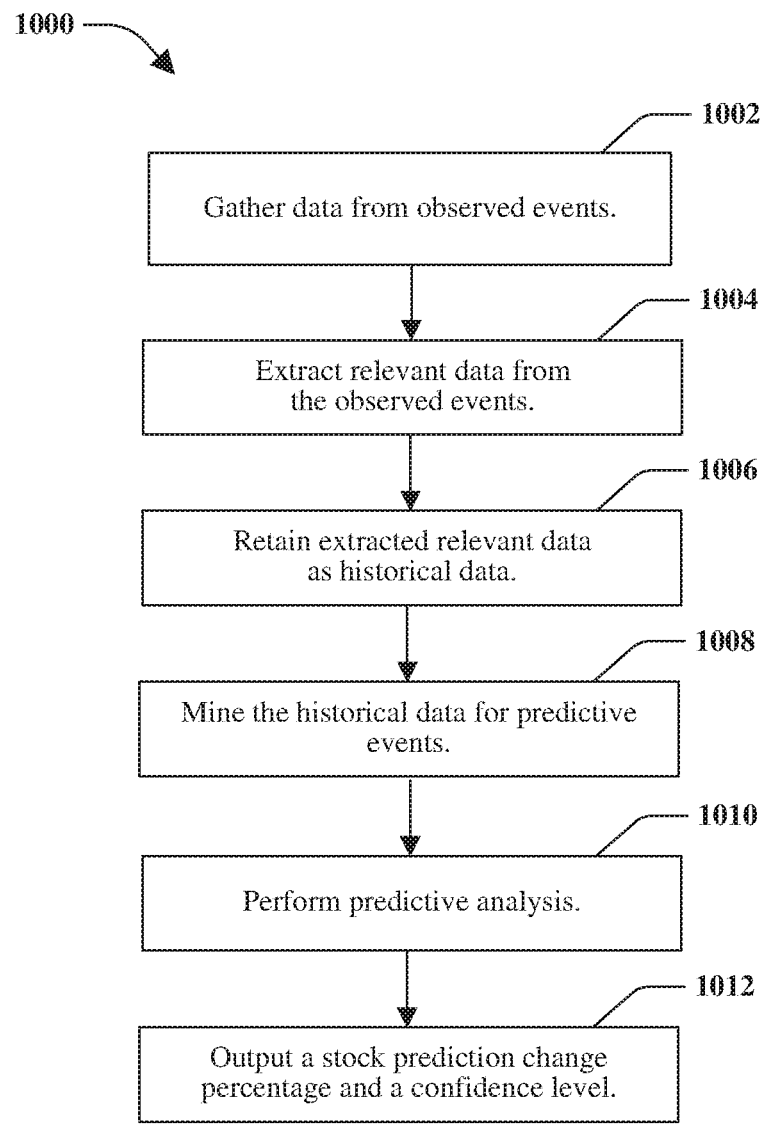
FIG. 10 illustrates an example, non-limiting method for predictive analysis of stocks, according to an aspect.

FIG. 10 illustrates an example, non-limiting method 1000 for predictive analysis of stocks, according to an aspect. The method 1000 in FIG. 10 may be implemented using, for example, any of the systems, such as the system 9 (of FIG. 900), described herein.

At 1002, data based on observed events are gathered. The events relate to activity available on the Internet, which may be automatically mined based on key words, key phrases, a source of the event (e.g., the company itself, a government body, a regulation body), and so on. According to some implementations, the data may be mined through the user of Internet bots or other types of gathering techniques. Sources of the data include, but are not limited to RSS feeds, search engine fees, press releases, and so on.

The data from the observed events are extracted for any information that may have an influence on a price of a stock or other security being analyzed, at 1004. The data extracted may be converted into a common computer-readable format. This extracted data is retained as historical data, at 1006.

At 1008, the historical data is mined for predictive events. For example, a recently received data (e.g., the data that was stored in the data store, at 1006) is compared to historical data already retained in the data store.

Predictive analysis is performed, at 1010. Artificial intelligence techniques may be utilized to perform the predictive analysis. For example, a pendulum ratio may be derived based on the number of lesser events compared to the number of higher events. An event score percentage may be based on a weighted classification multiplied by the pendulum ratio. Also calculated may be a stock prediction percentage, a weightage percentage, and a confidence level.

At 1012, at least the stock prediction change percentage and the confidence level are output. The output may be in any perceivable format and may be utilized by data or stock analysists to determine an action that should be taken for a particular stock. According to some implementations, the action may be performed automatically based on rules and/or policies established for one or more stocks. For example, if the movement is positive and the confidence level is high (e.g., above a threshold level, such as 75%), the rule may indicate to automatically purchase x number of shares of stock. In another example, if the movement is positive and the confidence level is between a certain percentage (e.g., between 50% and 75%), the rule may output a recommendation to buy the stock.

Figure 11:
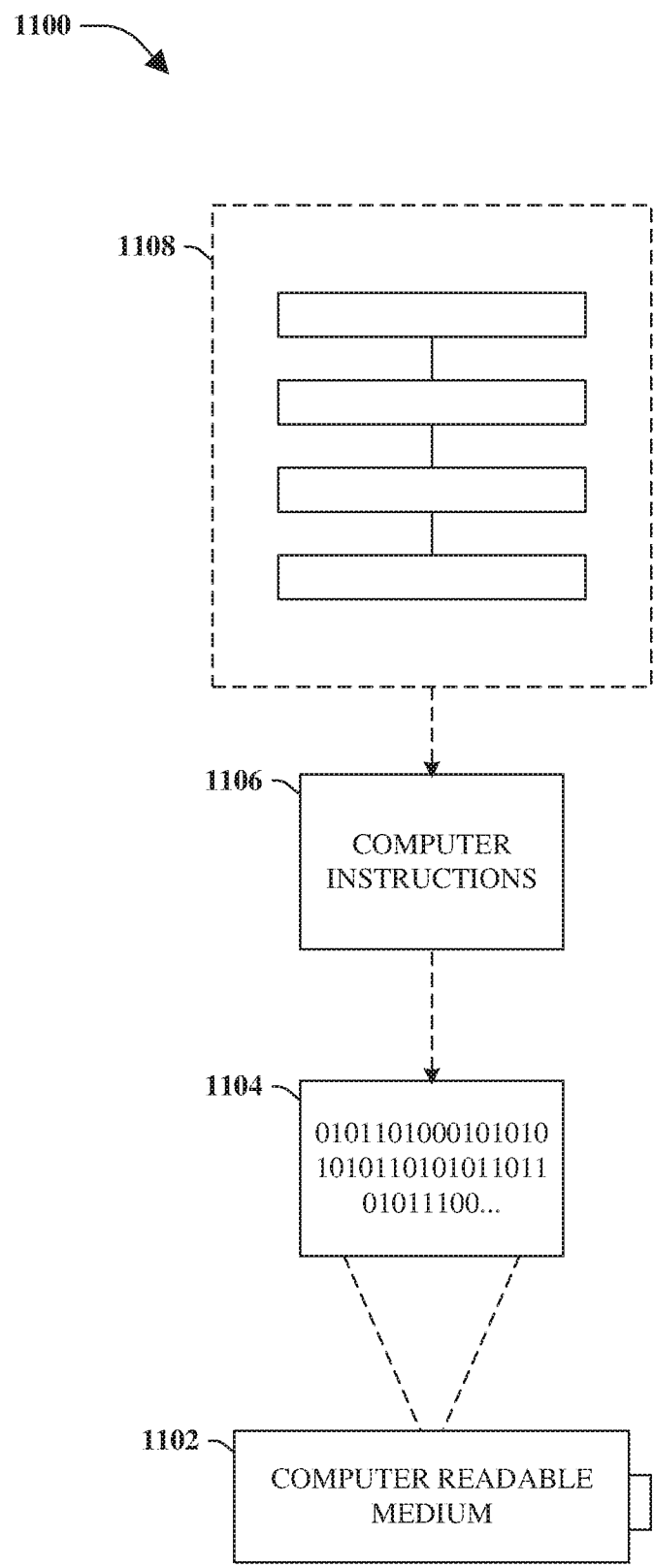
FIG. 11 illustrates an example, non-limiting computer-readable medium or computer-readable device including processor-executable instructions configured to embody one or more of the aspects set forth herein.

One or more implementations include a computer-readable medium including microprocessor or processor-executable instructions configured to implement one or more embodiments presented herein. As discussed herein the various aspects enable predictive data analysis of stocks. An embodiment of a computer-readable medium or a computer-readable device devised in these ways is illustrated in FIG. 11, wherein an implementation 1100 includes a computer-readable medium 1102, such as a CD-R, DVD-R, flash drive, a platter of a hard disk drive, and so forth, on which is encoded computer-readable data 1104. The computer-readable data 1104, such as binary data including a plurality of zero's and one's as illustrated, in turn includes a set of computer instructions 1106 configured to operate according to one or more of the principles set forth herein.

In the illustrated embodiment 1100, the set of computer instructions 1106 (e.g., processor-executable computer instructions) may be configured to perform a method 1108, such as the method 10 of FIG. 1000, for example. In another embodiment, the set of computer instructions 1106 may be configured to implement a system, such as the system 100 of FIG. 1 and/or the system 900 of FIG. 9, for example. Many such computer-readable media may be devised by those of ordinary skill in the art that are configured to operate in accordance with the techniques presented herein.

As used in this application, the terms "component", "module," "system", "interface," "manager," and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter may be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 11 and the following discussion provide a description of a suitable computing environment to implement embodiments of one or more of the aspects set forth herein. The operating environment of FIG. 11 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

Figure 12:
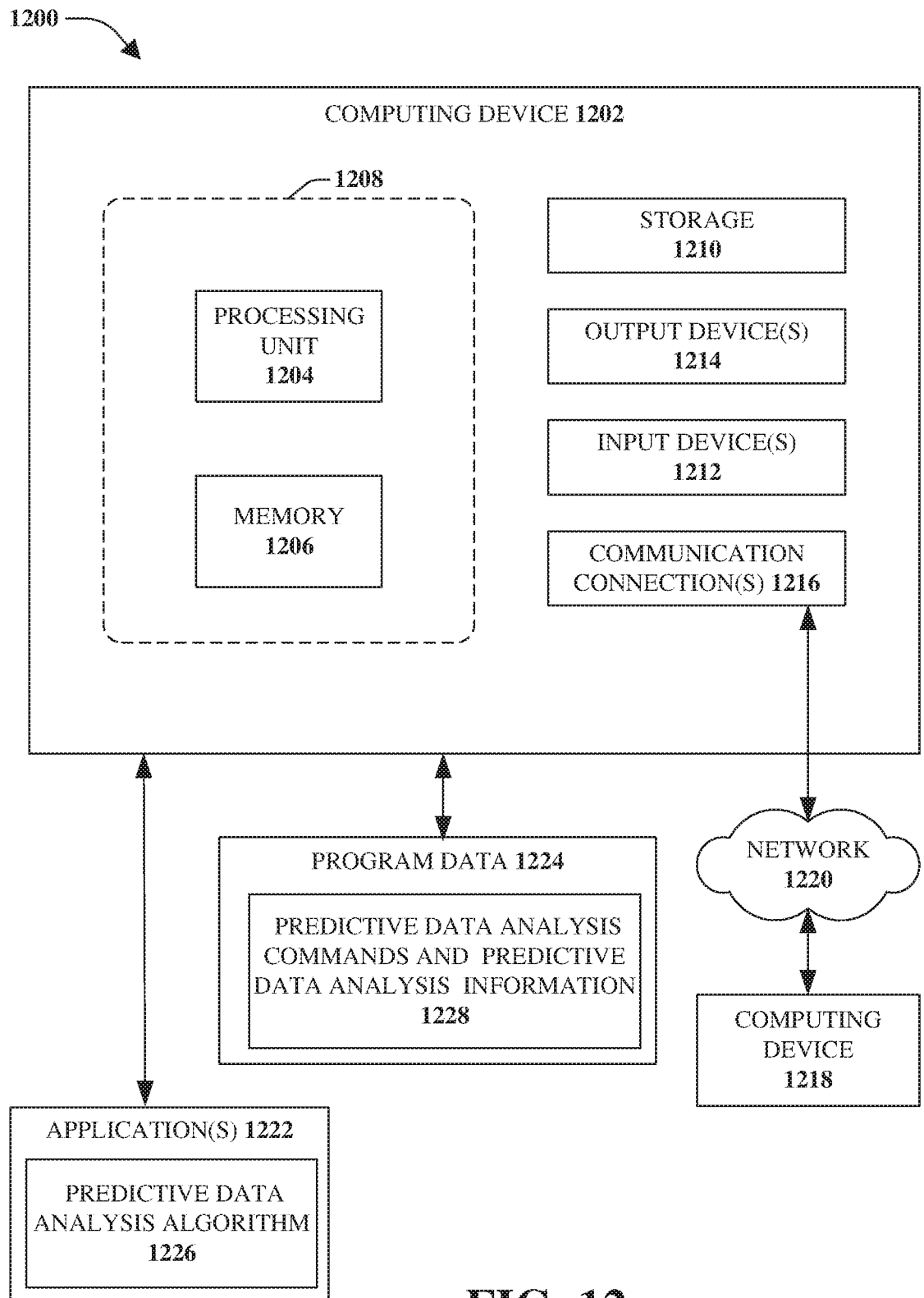
FIG. 12 illustrates an example, non-limiting computing environment where one or more of the aspects set forth herein are implemented, according to one or more aspects.

FIG. 12 illustrates a system 1200 that may include a computing device 1202 configured to implement one or more embodiments provided herein. In one configuration, the computing device 1202 may include at least one processing unit 1204 and at least one memory 1206. Depending on the exact configuration and type of computing device, the at least one memory 1206 may be volatile, such as RAM, non-volatile, such as ROM, flash memory, etc., or a combination thereof. This configuration is illustrated in FIG. 12 by dashed line 1208.

In other embodiments, the computing device 1202 may include additional features or functionality. For example, the computing device 1202 may include additional storage such as removable storage or non-removable storage, including, but not limited to, magnetic storage, optical storage, etc. Such additional storage is illustrated in FIG. 12 by storage 1210. In one or more embodiments, computer readable instructions to implement one or more embodiments provided herein are in the storage 1210. The storage 1210 may store other computer readable instructions to implement an operating system, an application program, etc. Computer readable instructions may be loaded in the at least one memory 1206 for execution by the at least one processing unit 1204, for example.

Computing devices may include a variety of media, which may include computer-readable storage media or communications media, which two terms are used herein differently from one another as indicated below.

Computer-readable storage media may be any available storage media, which may be accessed by the computer and includes both volatile and nonvolatile media, removable and non-removable media. By way of example, and not limitation, computer-readable storage media may be implemented in connection with any method or technology for storage of information such as computer-readable instructions, program modules, structured data, or unstructured data. Computer-readable storage media may include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which may be used to store desired information. Computer-readable storage media may be accessed by one or more local or remote computing devices (e.g., via access requests, queries or other data retrieval protocols) for a variety of operations with respect to the information stored by the medium.

Communications media typically embody computer-readable instructions, data structures, program modules, or other structured or unstructured data in a data signal such as a modulated data signal (e.g., a carrier wave or other transport mechanism) and includes any information delivery or transport media. The term "modulated data signal" (or signals) refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The computing device 1202 may include input device(s) 1212 such as keyboard, mouse, pen, voice input device, touch input device, infrared cameras, video input devices, or any other input device. Output device(s) 1214 such as one or more displays, speakers, printers, or any other output device may be included with the computing device 1202. The input device(s) 1212 and the output device(s) 1214 may be connected to the computing device 1202 via a wired connection, wireless connection, or any combination thereof. In one or more embodiments, an input device or an output device from another computing device may be used as the input device(s) 1212 and/or the output device(s) 1214 for the computing device 1202. Further, the computing device 1202 may include communication connection(s) 1216 to facilitate communications with one or more other devices, illustrated as a computing device 1218 coupled over a network 1220.

One or more applications 1222 and/or program data 1224 may be accessible by the computing device 1202. According to some implementations, the application(s) 1222 and/or program data 1224 are included, at least in part, in the computing device 1202. The application(s) 1222 may include a predictive data analysis algorithm 1226 that is arranged to perform the functions as described herein including those described with respect to the system 800 of FIG. 8. The program data 1224 may include predictive data analysis commands and predictive data analysis information 1228 that may be useful for operation with the various aspects as described herein.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

A device may also be called, and may contain some or all of the functionality of a system, subscriber unit, subscriber station, mobile station, mobile, mobile device, wireless terminal, device, remote station, remote terminal, access terminal, user terminal, terminal, wireless communication device, wireless communication apparatus, user agent, user device, or user equipment (UE). A mobile device may be a cellular telephone, a cordless telephone, a Session Initiation Protocol (SIP) phone, a smart phone, a feature phone, a wireless local loop (WLL) station, a personal digital assistant (PDA), a laptop, a handheld communication device, a handheld computing device, a netbook, a tablet, a satellite radio, a data card, a wireless modem card, and/or another processing device for communicating over a wireless system. Further, although discussed with respect to wireless devices, the disclosed aspects may also be implemented with wired devices, or with both wired and wireless devices.

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising," "comprises," "including," "includes," or the like generally means comprising or including.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A method, comprising:
    obtaining from at least a subset of a plurality of sources, by a system comprising a memory, a processor, and a machine learning module, a plurality of event information related to an event at substantially a same time as a reporting of the event, the reporting being captured in at least the subset of the plurality of sources;
    identifying, by the machine learning module, data determined to be relevant for an identified value indicator from the obtained event information;
    extracting, by the system, a set of data from the identified data at substantially the same time as the reporting of the event,
        wherein the extracting comprises preparing the extracted data to be incorporated into a database, and wherein the preparation comprises tagging the extracted data with a plurality of matrix tags;
    incorporating, by the system, the tagged extracted set of data into the database;
    mining, by the system, the database for other tagged extracted data that is similar to the set of data associated with the identified value indicator;
    determining, by the system, a result set based at least in part on processing by a predictive data analytics and an Intelligence Quota (IQ) engine of the mined tagged extracted data, wherein the predictive data analytics and the IQ engine employ the plurality of matrix tags and a pendulum ratio that controls a level of predictions to be calculated, and wherein the result set of the processing is determined at substantially the same time as the reporting of the event; and
    communicating, by the system, the result set to a device in or near real time.

2. The method of claim 1, wherein at least one of the plurality of sources is restricted to a subset of the plurality of sources comprising strictly electronically connected data feeds.

3. The method of claim 2, wherein the communicating the result set employs the at least one of the plurality of sources.

4. The method of claim 1, wherein the identifying of data determined to be relevant for the identified value indicator from the obtained event information, comprises determinations based at least in part on a pre-determined machine learned confidence level for the obtained event information to be associated with the identified value indicator.

5. The method of claim 1, wherein the identified value indicator is a registered stock value.

6. The method of claim 1, wherein the plurality of matrix tags comprise a class score master, an event score, a weightage score and a confidence level.

7. The method of claim 1, wherein the result set comprises at least two of a predicted price movement of the identified value indicator, a price-movement-associated confidence level, and a time window for which either of the predicted price movement and the confidence level or both are applicable.

8. The method of claim 1, wherein
    the identifying data determined to be relevant,
    the tagging the extracted data with the plurality of matrix tags, and
    the mining the database for other tagged extracted data that is similar each employ artificial intelligence techniques that incorporate feedback loops.

9. A system, comprising:
    a processor;
    a machine learning module; and
    a memory that stores executable instructions that, when executed by the processor, facilitate performance of operations along with the machine learning module, comprising:
        obtaining from at least a subset of a plurality of sources, by the system, a plurality of event information related to an event at substantially a same time as a reporting of the event, the reporting being captured in at least the subset of the plurality of sources;
        identifying, by the machine learning module, data determined to be relevant for an identified value indicator from the obtained event information;
        extracting, by the system, a set of data from the identified data at substantially the same time as the reporting of the event,
            wherein the extracting comprises preparing the extracted data to be incorporated into a database, and wherein the preparation comprises tagging the extracted data with a plurality of matrix tags;
        incorporating, by the system, the tagged extracted set of data into the database;
        mining, by the system, the database for other tagged extracted data that is similar to the set of data associated with the identified value indicator;
        determining, by the system, a result set based at least in part on processing by a predictive data analytics and an Intelligence Quota (IQ) engine of the mined tagged extracted data, wherein the predictive data analytics and the IQ engine employ the plurality of matrix tags and a pendulum ratio that controls a level of predictions to be calculated, and wherein the result set of the processing is determined at substantially the same time as the reporting of the event; and communicating, by the system, the result set to a device in or near real time.

10. The system of claim 9, wherein at least one of the plurality of sources is restricted to a subset of the plurality of sources comprising strictly electronically connected data feeds.

11. The system of claim 10, wherein the communicating the result set employs the at least one of the plurality of sources.

12. The system of claim 9, wherein the identifying of data determined to be relevant for the identified value indicator from the obtained event information, comprises determinations based at least in part on a pre-determined machine learned confidence level for the obtained event information to be associated with the identified value indicator.

13. The system of claim 9, wherein the identified value indicator is a registered stock value.

14. The system of claim 9, wherein the plurality of matrix tags comprise a class score master, an event score, a weightage score and a confidence level.

15. The system of claim 9, wherein the result set comprises at least two of a predicted price movement of the identified value indicator, a price-movement-associated confidence level, and a time window for which either of the predicted price movement and the confidence level or both are applicable.

16. The system of claim 9, wherein
the identifying data determined to be relevant,
the tagging the extracted data with the plurality of matrix tags, and
the mining the database for other tagged extracted data that is similar each employ artificial intelligence techniques that incorporate feedback loops.

17. A non-transitory computer-readable storage device that stores executable instructions that, in response to execution, cause a system comprising a processor and a machine learning module to perform operations, comprising:
obtaining from at least a subset of a plurality of sources, by the system, a plurality of event information related to an event at substantially a same time as a reporting of the event, the reporting being captured in at least the subset of the plurality of sources;
identifying, by the machine learning module, data determined to be relevant for an identified value indicator from the obtained event information;
extracting, by the system, a set of data from the identified data at substantially the same time as the reporting of the event,
wherein the extracting comprises preparing the extracted data to be incorporated into a database, and wherein the preparation comprises tagging the extracted data with a plurality of matrix tags;
incorporating, by the system, the tagged extracted set of data into the database;
mining, by the system, the database for other tagged extracted data that is similar to the set of data associated with the identified value indicator;
determining, by the system, a result set based at least in part on processing by a predictive data analytics and an Intelligence Quota (IQ) engine of the mined tagged extracted data, wherein the predictive data analytics and the IQ engine employ the plurality of matrix tags and a pendulum ratio that controls a level of predictions to be calculated, and wherein the result set of the processing is determined at substantially the same time as the reporting of the event; and
communicating, by the system, the result set to a device in or near real time.

18. The non-transitory computer readable storage device of claim 17, further:
wherein the identifying of data determined to be relevant for the identified value indicator from the obtained event information, comprises determinations based at least in part on a pre-determined machine learned confidence level for the obtained event information to be associated with the identified value indicator;
wherein the identified value indicator is a registered stock value; and
wherein the plurality of matrix tags comprise a class score master, an event score, a weightage score and a confidence level;
wherein the result set comprises at least two of a predicted price movement of the identified value indicator, a price-movement-associated confidence level, and a time window for which either of the predicted price movement and the confidence level or both are applicable; and
wherein
the identifying data determined to be relevant,
the tagging the extracted data with the plurality of matrix tags, and
the mining the database for other tagged extracted data that is similar each employ artificial intelligence techniques that incorporate feedback loops.

* * * * *